US006543639B1

(12) United States Patent
Kovens

(10) Patent No.: US 6,543,639 B1
(45) Date of Patent: Apr. 8, 2003

(54) ANIMATED CANDY DISPENSER AND METHODS

(75) Inventor: Brian Kovens, Owings Mills, MD (US)

(73) Assignee: A & A Global Industries, Inc., Timonium, MD (US)

( * ) Notice: Subject to any disclaimer, the term of this patent is extended or adjusted under 35 U.S.C. 154(b) by 125 days.

(21) Appl. No.: 09/644,794

(22) Filed: Aug. 24, 2000

Related U.S. Application Data

(60) Provisional application No. 60/150,825, filed on Aug. 26, 1999.

(51) Int. Cl.[7] ......................... A24F 15/04; G07R 11/00; B65H 1/08; G07F 11/16; A01C 9/00

(52) U.S. Cl. ......................... 221/24; 221/232; 221/229; 221/217; 221/218; 221/219; 221/239

(58) Field of Search .......................... 221/229, 24, 232, 221/239, 217, 218, 219

(56) References Cited

U.S. PATENT DOCUMENTS

| | | | | | |
|---|---|---|---|---|---|
| 1,888,050 | A | * | 11/1932 | Rabkin et al. | 212/197 |
| 2,361,977 | A | * | 11/1944 | Stair | 312/94 |
| 2,620,061 | A | * | 2/1952 | Uxa | 206/42 |
| 2,789,726 | A | * | 4/1957 | Wilson et al. | 221/84 |
| 3,410,455 | A | * | 11/1968 | Haas | 221/229 |
| 3,411,664 | A | * | 11/1968 | Davis | 221/88 |
| 3,479,101 | A | * | 11/1969 | Poor et al. | 221/24 |
| 3,499,262 | A | * | 3/1970 | Thurston et al. | 53/124 |
| 3,565,284 | A | * | 2/1971 | Hinterreiter | 221/229 |
| 3,844,445 | A | * | 10/1974 | Haas | 221/229 |
| 4,171,753 | A | * | 10/1979 | Vreede | 221/197 |
| 4,295,579 | A | * | 10/1981 | Haas | 221/229 |
| 4,311,251 | A | * | 1/1982 | Sternberg | 221/24 |
| 5,048,720 | A | * | 9/1991 | Hoke | 221/198 |
| 5,071,033 | A | * | 12/1991 | Siwek | 221/198 |
| 5,080,258 | A | * | 1/1992 | Hinterreiter | 221/198 |
| 5,178,298 | A | * | 1/1993 | Allina | 221/24 |
| 5,566,857 | A | * | 10/1996 | Rothman | 221/229 |
| 5,651,475 | A | * | 7/1997 | Fenton | 221/24 |
| 5,791,514 | A | * | 8/1998 | Kirk, III et al. | 221/81 |
| 6,129,608 | A | * | 10/2000 | Prichard et al. | 446/475 |
| 6,220,479 | B1 | * | 4/2001 | Fishman | 221/24 |
| 6,267,639 | B1 | * | 7/2001 | Menow et al. | 446/81 |
| 6,299,015 | B1 | * | 10/2001 | Hasan et al. | 221/24 |
| 6,425,495 | B1 | * | 7/2002 | Senda et al. | 221/24 |

OTHER PUBLICATIONS

Pez Collectors News, History, www.pezcollectornews.com/history.html, retrieved Jan. 30, 2002.*

* cited by examiner

*Primary Examiner*—Donald P. Walsh
*Assistant Examiner*—Michael E. Butler
(74) *Attorney, Agent, or Firm*—Cahn & Samuels, LLP

(57) ABSTRACT

An animated candy dispenser for tablet candy pieces including a magazine for storing the candy in a columnar manner, a finger actuated button mechanically linked to a dispensing assembly that includes a movable character with candy gripping extensions to grab and retain a piece of candy and withdraw it from the dispenser.

12 Claims, 6 Drawing Sheets

ANIMATED CANDY DISPENSER AND METHODS

RELATED APPLICATION

This application claims priority from U.S. Provisional Application Ser. No. 60/150,825 filed Aug. 26, 1999.

TECHNICAL FIELD

The present invention is directed to a novel hand held and digit operated candy tablet dispenser.

BACKGROUND OF THE INVENTION

Hand held Candy Dispensers are well known and popular particularly in certain age groups. PEZ has developed a loyal following of consumers and collectors over the years. However, as in the case of most available dispensers, the dispensing action involves pushing a tablet from a tablet magazine. In other words it is not very interesting or fun. Examples of such dispensers are contained in the disclosures of U.S. Pat. Nos. 5,048,720; 5,080,258; 5,366,112, 5,460,295; 5,178,298; and 5,785,206.

Based on a review of the state of the art, it appears that an animated hand-held, digit-actuated candy tablet dispenser has been overlooked.

SUMMARY OF THE INVENTION

It is therefore an object of the present invention to provide a hand-held, animated, tablet candy dispenser.

It is another object of the present invention to provide an animated candy dispenser that includes a pivotal candy gripping and retaining assembly that removes a selected candy item from a generally cylindrical candy stacking magazine to a candy dispensing position above the magazine.

As depicted, the novel dispenser includes a pivotally mounted character with out-stretched arms, pinchers, mouth, etc., (generically grabber). on the top of the candy holder. As a slide button on the dispenser is translated, a linkage to the character causes the character to bend over, grab the top piece of candy inside the candy holder with the grabber, and then pivot to the neutral/standing/un-actuated position while retaining the piece of candy. Preferably, the candy is concealed in the magazine by a trap door or the like until the dispenser is actuated. The trap door/guillotine is linked to the actuator/slide button to retract and expose the candy item as the character pivots/bends down to grab the candy piece. After removing the candy from the magazine, as the character pivots back to the neutral position, the door translates to the closed position.

Given the following provisional description of the drawings, the concept of the inventive animated candy dispenser should be understood by a person of ordinary skill in the art.

DETAILED DESCRIPTION OF THE ILLUSTRATED EMBODIMENT

Figure 1:
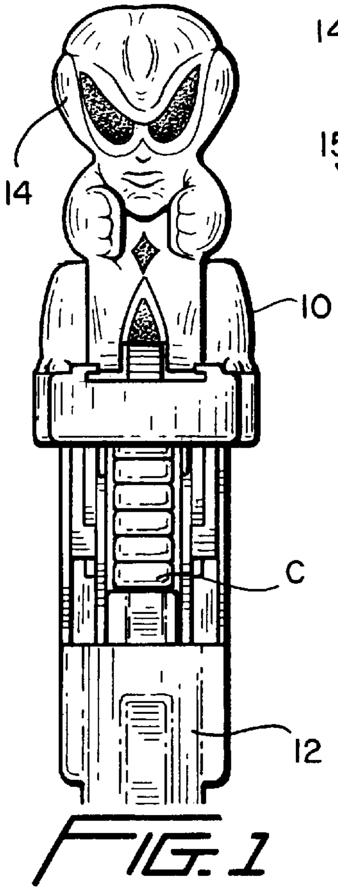
FIG. 1 is a front photographic view of a prototype version of the invention.
Figure 2:
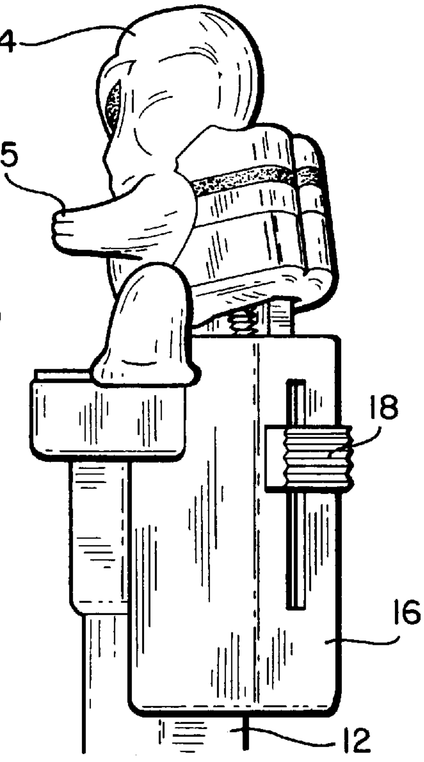
FIG. 2 is a rear perspective photographic view of a prototype version of the embodiment depicted in FIG. 1.
Figure 3:
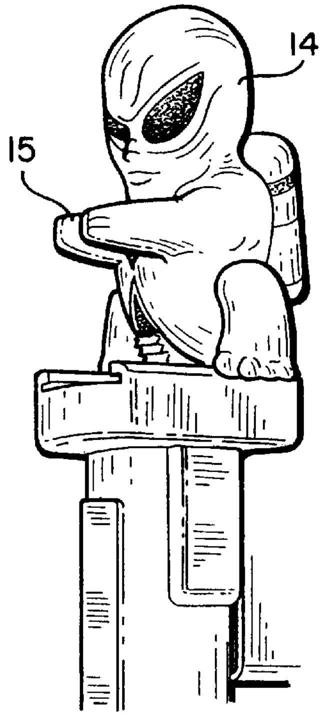
FIG. 3 is the first of a sequence series of a perspective photographic view of the embodiment of FIG. 1 in the neutral position.
Figure 4:
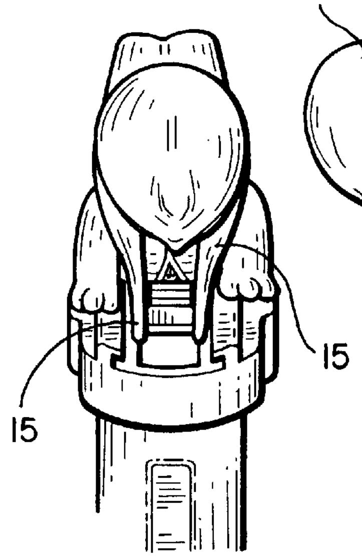
FIG. 4 is a front photographic view of the embodiment depicted in FIG. 1 during pivoting to retrieve a tablet from the magazine.
Figure 5:
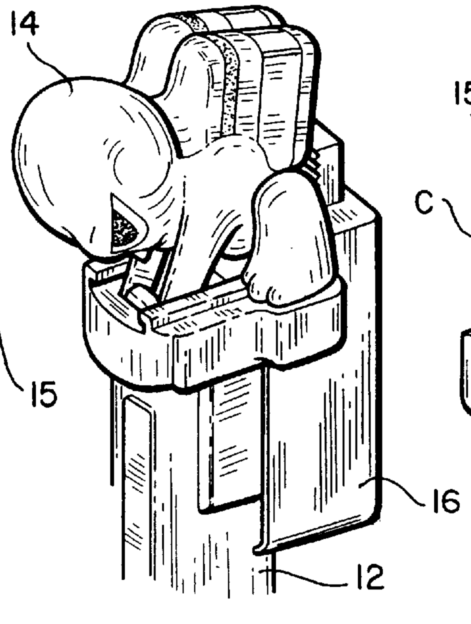
FIG. 5 is a perspective view of the character grabbing a tablet.
Figure 6:
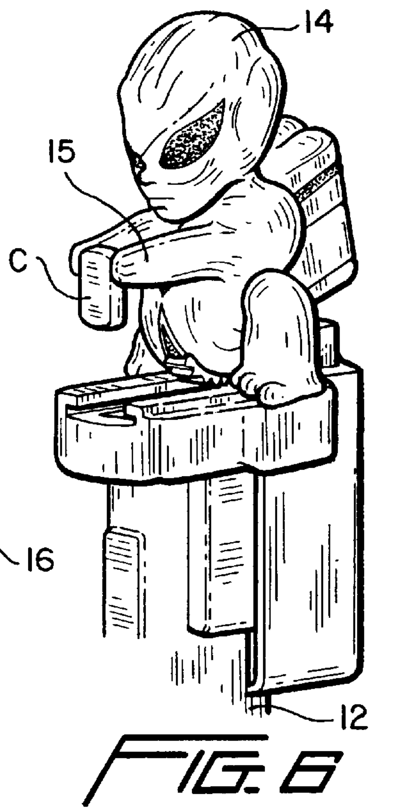
FIG. 6 depicts the character returned to the neutral position while holding a candy tablet.

FIGS. 1–6 illustrate a hand-held dispenser 10 comprising a reloadable cylindrical candy tablet magazine 12 with stacked candy C and a pivotable candy grabber character 14 disposed at the top of the magazine 12. The character 14 is depicted as a Roswell-style alien but can be representative of any desired person, body-part, fictional being, etc. so long as it includes a candy grabbing element 15, e.g. arms. The magazine 12 is attached to an actuator housing 16 which features the translatable slider button 18 for actuating the dispensing mechanism. When the button 18 is translated downwardly, the character 14 pivots relative to the magazine 12 to a point where the arms 15 project into the top of the magazine 12 to engage the sides of the candy tablet C. Once frictionally engaged, the button 18 is translated upwardly to cause the characters 14, now holding the candy tablet C by an interference fit, to return to the neutral position.

Figure 7:
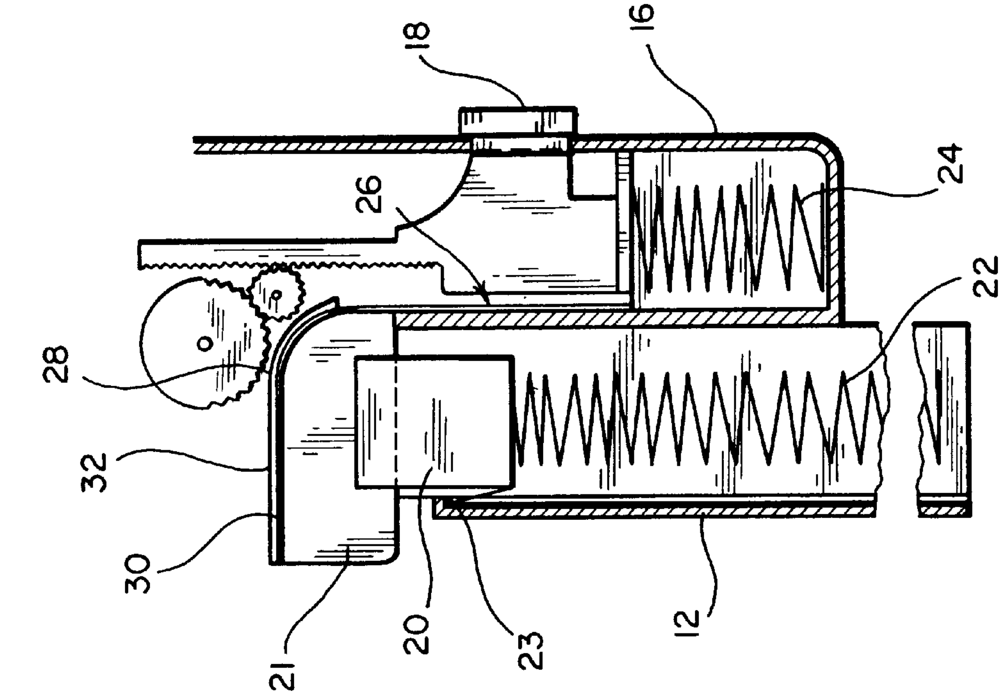
FIG. 7 is a partial schematic cross-sectional side view of an embodiment of the invention in a neutral position.
Figure 8:
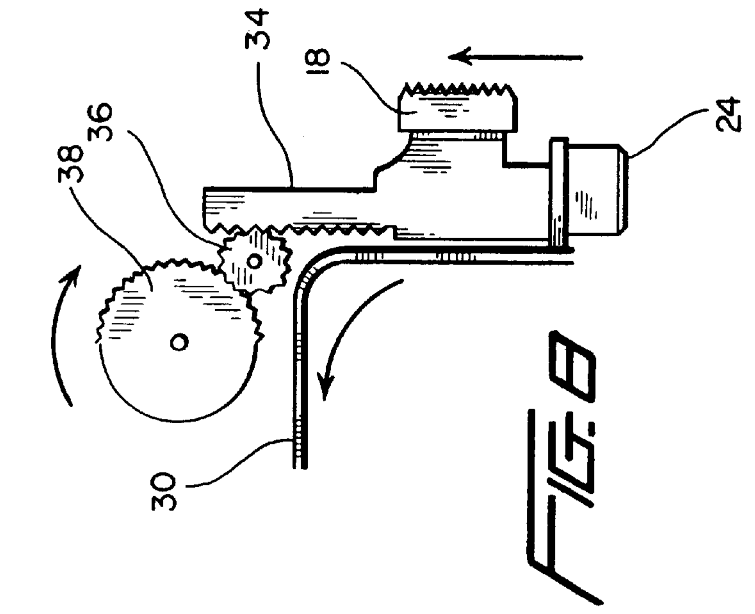
FIG. 8 is a partial assembly side view of the embodiment of FIG. 7 returning to the neutral position.
Figure 11:
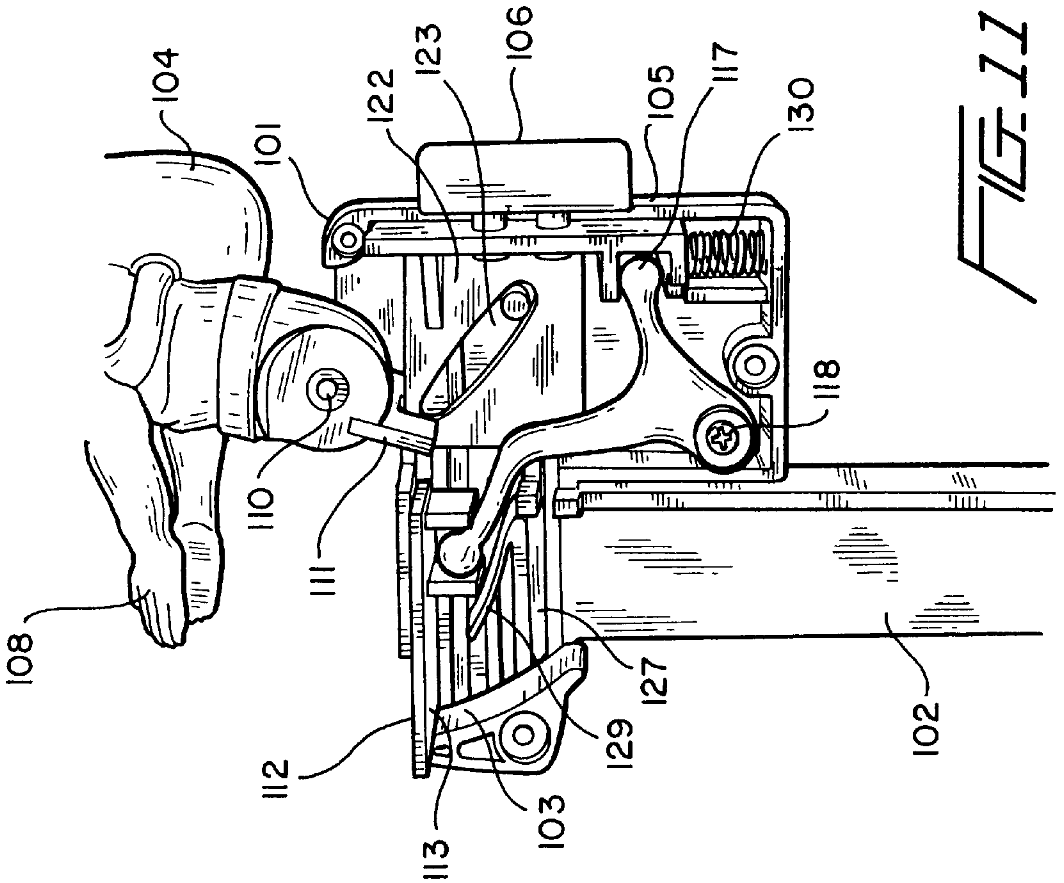
FIG. 11 is a cutaway side perspective view of the dispenser according to FIG. 10.
Figure 9:
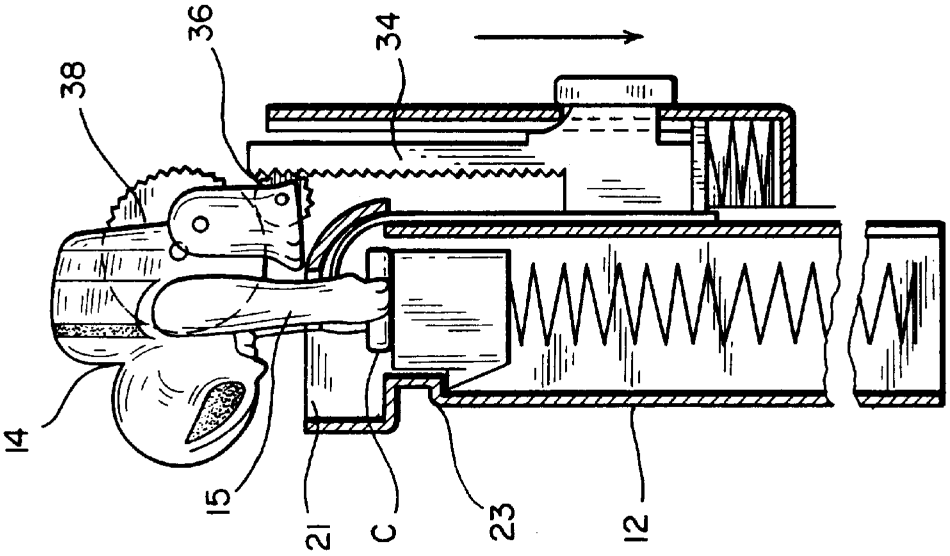
FIG. 9 is a schematic side view of the embodiment of FIG. 7 being actuated to dispense a piece of candy.
Figure 12:
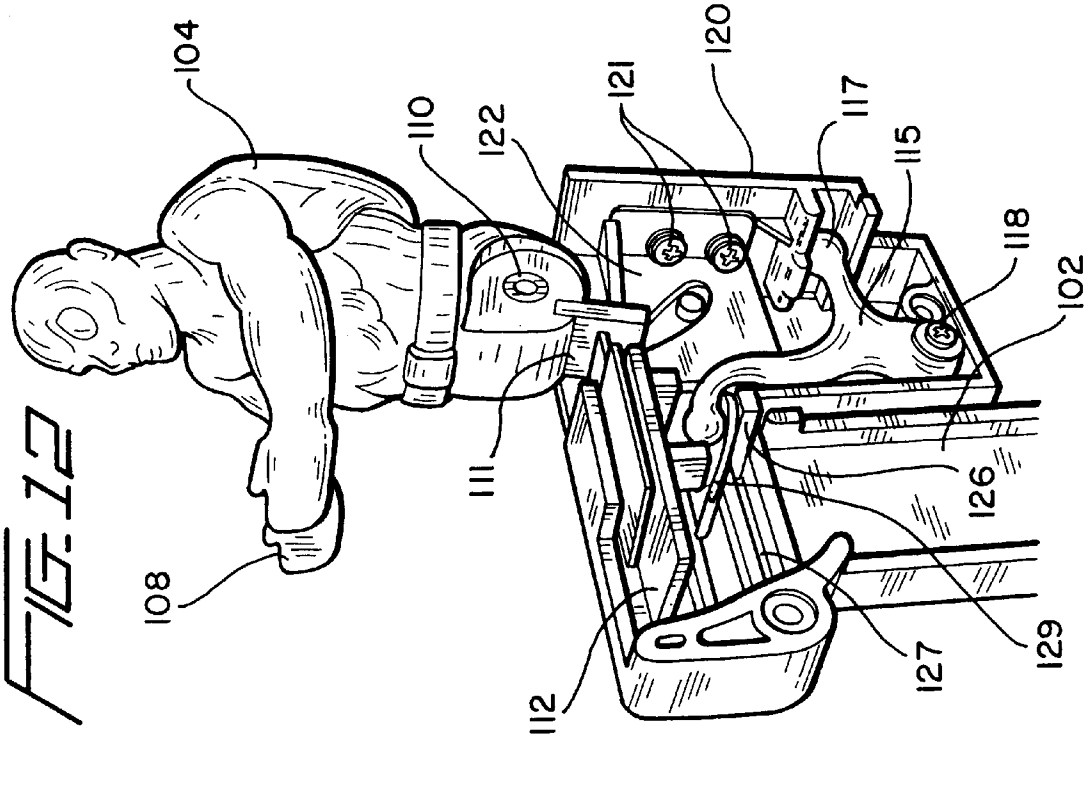
FIG. 12 is a cutaway front perspective view of the dispenser according to FIG. 10.
Figure 10:
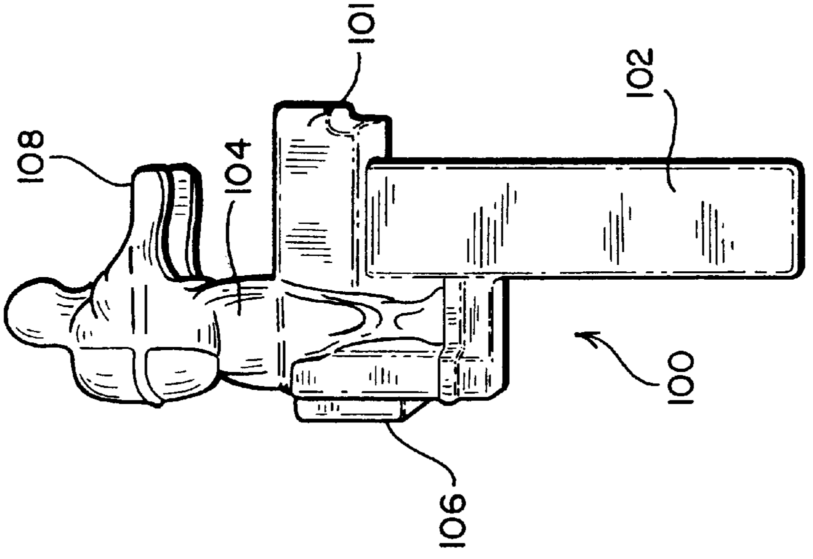
FIG. 10 is a side view of a second embodiment of an animated candy dispenser according to the invention.

FIGS. 7–9 illustrate a mechanical assembly that provides for the dispensing action described above. The magazine 12 includes a candy supporting platform 20 biased upwardly by a helical spring 22. The tube portion of the magazine partially underlies the character 14 to prevent undesired ejection of the magazine content. An off-set dispensing chamber 21 is disposed at the top of the magazine and overlies a platform stop 23. The actuator housing 16 features a helical return spring 24 which biases the button 18 toward the top of the housing (the neutral position). A sliding shutter door member 26 is disposed in a longitudinal track 28 disposed between the housing 16 and the magazine 12 and curves over the top of the magazine 12 form a sliding door 30 which covers opening 32 when the button 18 is in the neutral position.

The actuation is accomplished via a geared drive assembly attached to the button 18. Projecting above button 18 is toothed rack 34 which engaged a spur type pinion gear 36 which in turn is in meshing engagement with spur gear 38 which is formed directly in or secured to character 14. The spur gear 38 may be aligned on the character pivot axis or may be offset therefrom.

In operation, as the button 18 is depressed against the opposing force of spring 24. As the button moves toward the bottom of the housing 16, shutter door member 26 moves correspondingly. Thus, the door 30 retracts from opening 32 to permit the character to move into the chamber 21. Coincidental with the downward movement of the button 18, the pinion gear 36 is rotated by is meshing connection with rack 34 to thereby cause rotation of the spur gear 38. As the spur gear 38 rotates, the character 14 pivots until the arms 15 frictionally clamp on top the sides of candy tablet C. At that point, the button 18 is moved back toward the neutral/starting position assisted by the compressive spring force of spring 24. As the button translates upwardly, the character 14 pivots and the arms swing through an arc accommodated by the chamber 21 to remove the candy C from the magazine. Coincidental with this action, the shutter door 26 moves to the closed position this sealing the magazine.

In connection with the quality of the use of the invention, it is believed that many different variations of the structures can be used to convey a theme to improve the amusement impact of the dispenser. For example, the figure may be a wrestler that is lifting weights or a mummy pulling treasure from a pyramid. The figure may represent any anthropomorphic theme or other easily recognizable themes such as an animal biting.

Referring to the embodiment of FIGS. 10–13, it represents the preferred prototype of a digit-actuated, animated candy dispenser invention 100. The dispenser 100 comprises, in essence, a pick-and place type, unloading device. In this form, the candy dispenser 100 is dimensioned to dispense rectangular tablets and is preferably formed from relatively rigid, injection-molded polymeric resins. Other materials including metal can be used for premium products, but in the mass-market area, thermoplastic resins are preferred. For the sake of merchandising, rectangular candy tablets, e.g. KOKO's or PEZ, represent the preferred candy tablet geometric configuration. However, it is to be understood that the invention is not intended to be limited to use with candy of rectangular geometry but, rather, is intended to embrace arrangements accommodating other geometries dispensable animated candy piece dispensing according to the broad scope of this invention.

The candy tablet dispenser 100 defines dispensing mechanism housing 101 of a generally rectangular configuration positioned atop and in candy piece/tablet communication with a generally tubular (rectangular as illustrated), elongated candy piece retaining columnar magazine 102. The mechanism housing 101 includes a candy-retaining chamber 103 disposed forwardly within the housing and offset from the storage magazine 102.

The candy dispenser 100 prominently features an animated character 104 the upper portion/torso portion 107 of which, as illustrated, is adapted to pivot relative to the housing 101 and the magazine 102 upon translation (generally by a user's thumb but can be by any digit) of an actuation button 106 disposed on the slotted back wall 105 of the housing 101.

The digit controlled actuating button 106, as illustrated, is mounted to the back wall 105 in a manner to permit vertically directed translation thereof for a select distance. As illustrated, digit controlled actuating button 106 is associated with a direct mechanical linkage to the animated character 104. Preferably, the button 106 is spring biased upwardly by a helical spring 130 (See FIG. 11).

Regardless of the source of mechanical energy, a critical feature of all of the embodiments of the invention is the presence of a candy piece grabber member that typically includes a pair of opposed elements associated with the animated character 104. The grabber member is dimensioned and adapted for frictionally engaging a candy piece by an interference fit functionality established by the cooperation of the opposed grabber element members 108.

As illustrated in this and the other embodiments, the grabber member comprises a pair of outstretched arms 108 that are relatively rigidly mounted to the character torso, but are capable of a small amount of separation distortion. Such distortion can be achieved by well known means, for example, by selecting a moldable thermoplastic material exhibiting a desired amount of elasticity/resiliency to thereby allow the opposed arms to be pushed apart slightly upon contacting a candy piece and then compress against the candy piece sides once the candy piece is properly disposed in the dispensing chamber 103. The distance separating the contact portions of the arms 108 will be dictated by and correspond to the width of the candy pieces for which that dispenser is intended. Thus, upon contact with the candy piece, the arms distort to slide along the candy piece sides to establish sufficient frictional engagement for the grabber to subsequently manipulate the candy piece from the dispensing chamber 103 of the housing 101.

The grabber element members are moved between a neutral, resting position and a candy piece engaging position by pivoting the character torso 104 about a transversely disposed dowel 110 The bottom of the torso is so mounted to be journaled and pivotable about the dowel 110. The torso preferably includes an internally disposed helical spring to facilitate return the upstanding position. Although not depicted, the spring is attached to the housing 101 and to the bottom of the torso. So as not to interfere with pivoting, preferable the spring is connected to the torso behind the dowel 110 and a depending planar flap 111. The flap 111, which extends below the torso base into the rearward portion of housing 101, preferably is integrally formed with the torso during fabrication but, not being so limited, the invention contemplates fixed attachment by any appropriate means such as gluing. The length of the flap is intended to permit direct contact and engagement with a translatable gate/door 112 slidably mounted to reciprocate within the housing 101. Preferably, as illustrated, the width of the flap 111 is less than the width of the door/gate 112 which itself is dimensioned to have a width less than that of the housing 101. The slidable door/gate 112 preferably is molded from a clear thermoplastic resin to permit viewing of the action of dispenser 101 through the dispensing cycle. The specific optical properties of the door/gate, of course is a design selection.

The door/gate 112 action reciprocates to uncover the dispensing chamber 103 allowing arms 108 access therein followed by a reverse sliding movement. The illustrated mechanical linkage for this reciprocating action is a downwardly directed F-shaped structure incorporating a U-linkage 113 disposed at the rearward end of door/gate 112. The U-linkage is dimensioned to receive the rounded terminus 114 of the longer arm portion 116 of the pivotally mounted rocker arm 115 (analogous to a ball-and-socket joint). The generally L-shaped rocker arm 115 is pivotally mounted near the bottom of the housing 101 by mounting screw 118. The rocker arm 115 also includes a second shorter arm portion 117 which also features a rounded terminus 114. The rounded terminus of arm portion 117 is adapted to be received within U-linkage 119 formed in respect to a button plate 120 forming an inverted F-shaped structure positioned at the lower end of the button plate 120. The button plate 120 is directly secured by any suitable means to the button 106 (in the present embodiment by screws 121) and is disposed interiorly along the back wall 105 and vertically slidable relative thereto. A plate cam 122 with a chamfered diagonal slot 123 is mounted in the button plate projecting forwardly and perpendicularly therefrom. The slot 124 is sized to engagably receive lug 124 forming the back end of a slidable magazine stop member 125. The magazine stop member 125 is slidably mounted within a track 127 in the housing 101 along the lower portion of chamber 103 where it communicates with magazine 102. A stop 126 forms the forward end of the stop member 125 and is attached to the lug 124 by a strut 127. The stop member 125 is an integrated, one piece structure that reciprocates, by the camming action of plate 122 on the lug 124 to move stop 126 into a candy piece obstructing position at the top of the magazine 102 which comprises a conventional spring box structure corresponding to the structure of that described in the connection with the first embodiment. To assist with directional orientation of the candy piece from the magazine for dispensing, a baffle 129 may be used.

The candy dispensing-function of the invention is achieved by the above-described structure as follows. After loading candy pieces in the candy magazine 102, the operator slides the button 106 downwardly relative to the housing 101. That action causes several coincidental mechanical actions. As the cam plate 122 moves downwardly, the stop member 125 retracts a n d moves stop 126 from its magazine blocking position. The spring bias candy platform within the magazine 102 urges the uppermost candy piece upwardly and into the chamber 103. Simultaneously, the terminus 117 of rocker arm 115 is forced downwardly which causes the rocker arm to pivot about screw 118 which pivots arm 116, which due to its curved shape, rounded terminus, and the U-linkage 113 on gate/door 112, converts the rotational movement to translational movement. This translational movement is imparted to the access door relative to the housing 103. As the gate retracts, it contacts and displaces the depending flap 111 of the animated figure 104, causing the torso to pivot toward the now opening access to the chamber 103. As the downward movement of the button 106 nears the end, the arms 108 enter the now-opened chamber 103 and grab the candy piece along its sides. The dispenser is now loaded and ready to dispense the candy piece. It should be readily appreciated from the foregoing that the degree of retraction of the gate/door 103 is both synchronized and proportional to the movement of the button 106.

Once the candy piece is engaged, the button 106 is released and the spring 130 urges the button upwardly. Thus a reversal of the above-described movements is acheived. The use of the helical springs assists in returning the dispenser to its neutral, non-dispensing position as the animated character and the now-candy bearing arms 108 pivot out of the chamber. Simultaneously, the gate/door 112 translates toward the closed position and the stop member 125 retracts to permit the next piece of candy to enter the chamber 103 for the next dispensing sequence.

Figure 14:
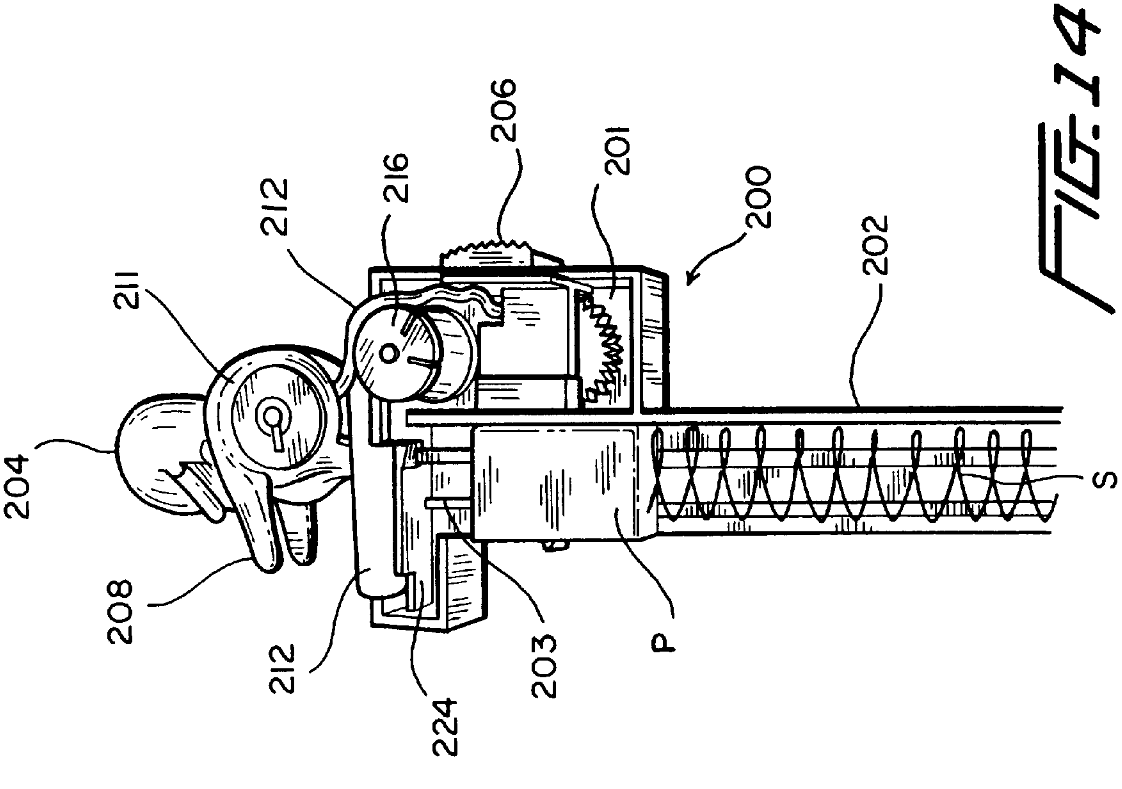
FIG. 14 is a side view of a third embodiment of an animated candy dispenser according to the invention.
Figure 15:
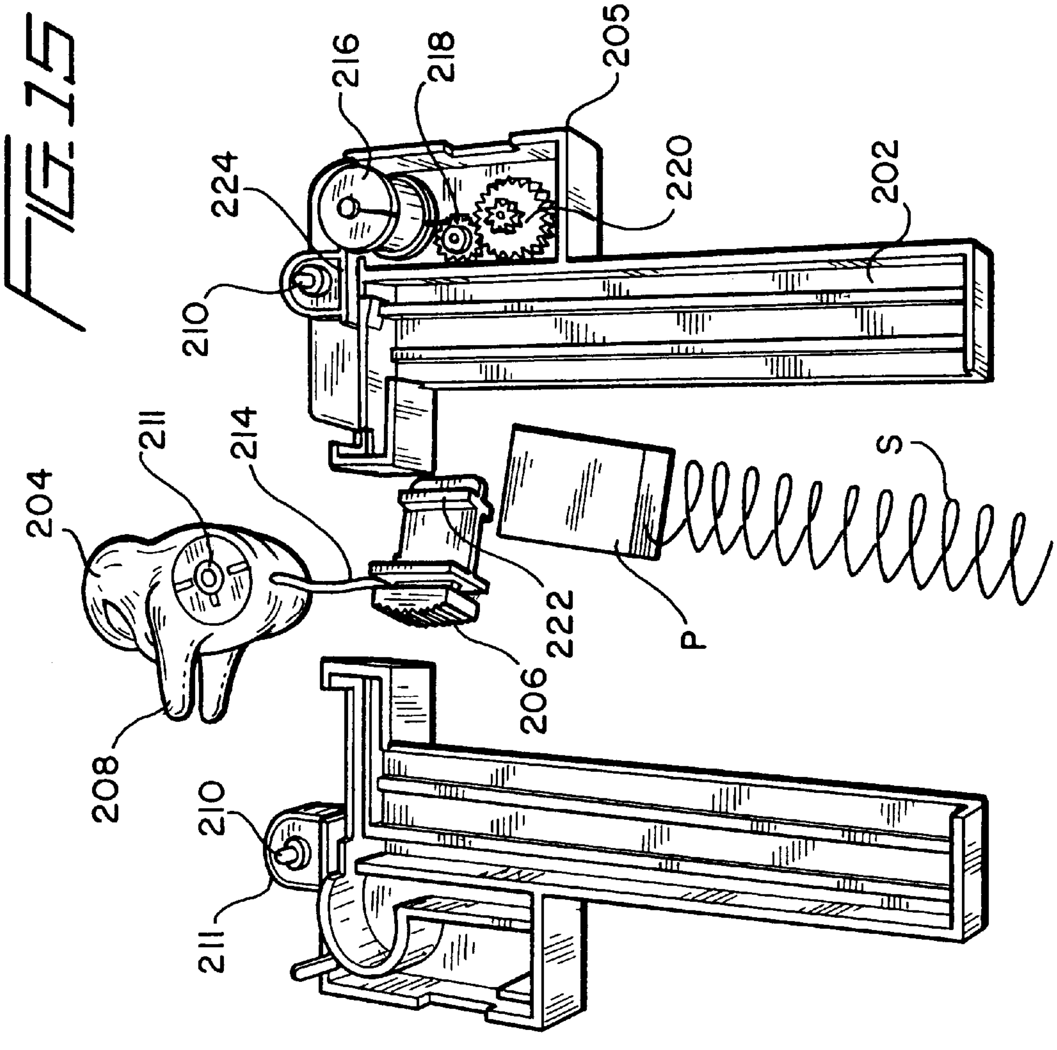
FIG. 15 is an assembly side perspective view of the dispenser according to FIG. 14.
Figure 13:
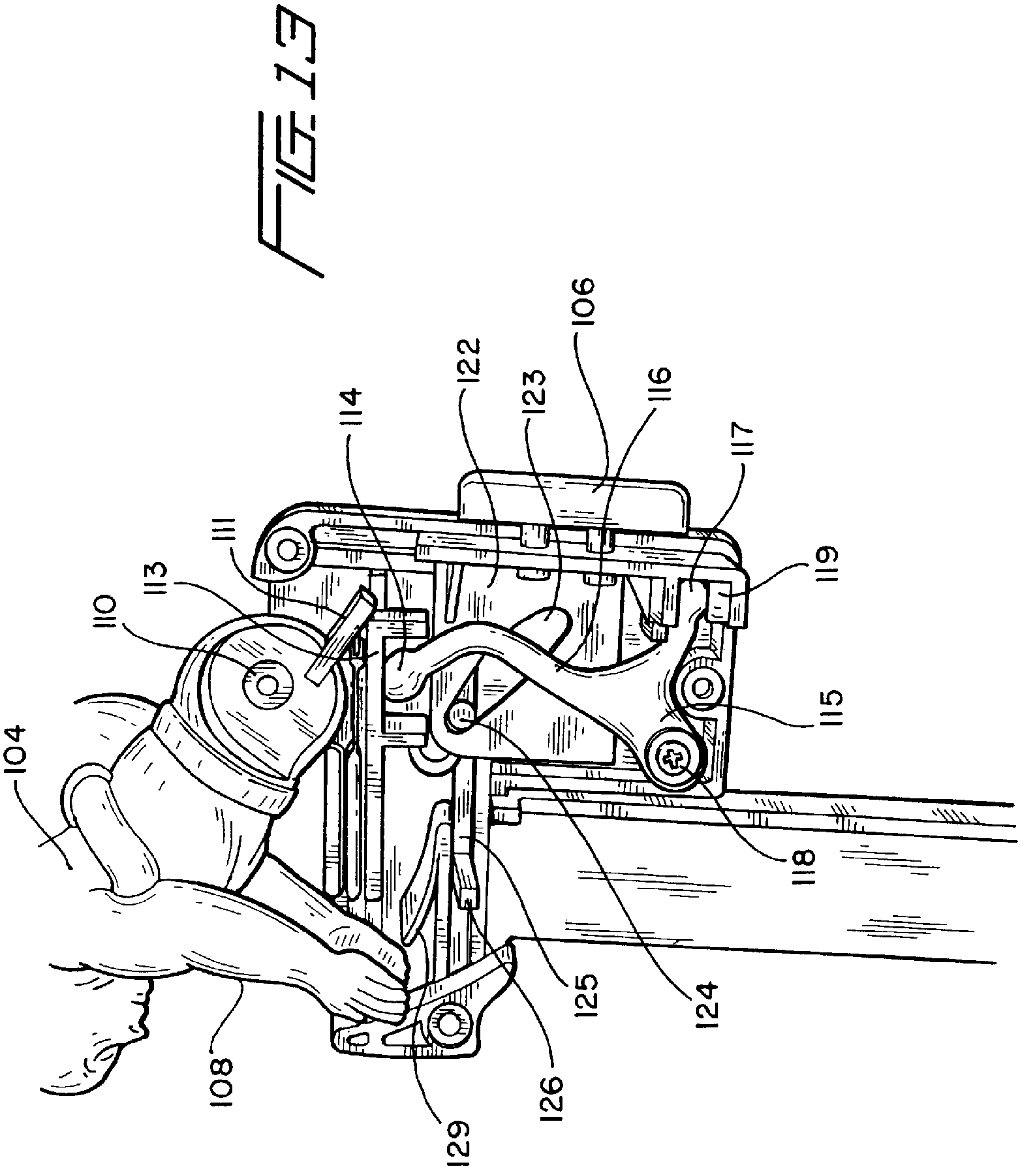
FIG. 13 is a cutaway side view of the dispenser according to FIG. 10 in a candy piece contact position.

The third illustrated embodiment depicted in FIGS. 14 and 15 comprises a dispenser 200 which in many ways resembles the second described embodiment. The dispenser 200 includes a dispensing mechanism housing 201 incorporating a gated dispensing chamber 203 and a slotted back wall 205 retaining a slidable button 206. The housing 201 supports pivoting character 204 and is disposed above a candy piece magazine 202 including candy platform P biased upwardly by spring S. In this embodiment the character is pivotally mounted to legs 210 that are affixed to the top of the housing 201 via dowel lugs 211 sized and shaped to cooperate with complementary dowel lug receiving bores. Preferably, one of the dowel lugs projects into the torso from one of the legs and the other projects from the torso 204 into a bore formed in the other leg. The latter dowel member preferably possesses a non-circular shape and interengages with a small leaf spring established within the torso to spring bias the torso to an upright, non-dispensing position.

The torso 204, in this embodiment is operatively connected to the button 206 by a cord 214 where retracting the button 206 causes the torso to pivot about the dowels and against the bias of the internal spring, where the grabber arms 208 rotate into the dispensing chamber 203.

As in the first embodiment, the third embodiment features a flexible plastic guillotine gate 212. The gate 212 wraps and unwraps about a spool 216, which is rotated by a gear train. The gear train is established between spur gearing disposed on the spool in contact with an intermediate spur gear 218 which in turn is connected to the larger wheel of a stepped spur gear 220 having its smaller wheel comprising the pinion of a rack and pinion arrangement between stepped spur gear 220 and a rack 222 associated with the button 106. In order to reduce the number of mechanical parts, this third embodiment includes a fixed deflecting baffle member 224 integrally molded with and disposed across the top of magazine 202 and at the back of the dispensing chamber 203. The baffle member 224 should include a directional contact surface (angled or curved) to urge a candy piece to move laterally relative to the magazine.

In operation, the third embodiment exhibits coordinated movement including directing the candy from the candy magazine into the chamber, opening and closing of the gate 212, and pivoting of the torso 204 to retrieve and retain a candy piece from the chamber 203. Upon sliding of the button 206, the cord connected to the torso is tensioned and causes the rotation of the torso toward the housing 201 where the arms 208 can move into the chamber 203. Simultaneous to this action, the rack turns the pinion, turning the gear train causing the spool to rotate and retract the gate 212. The arms 208 engage the sides of the resident candy piece in the chamber 203.

Upon reversing directional force on the button 206, the spring assists in the return of the torso to the standing/neutral position. As the torso pivots, the candy piece retaining arms 208 rotate out of the out chamber 203. As the candy piece is removed from the chamber 103, the spring bias platform P urges the topmost piece of candy into the now vacated chamber 203. Meanwhile, application of upwardly directed force on the button 206 reverses the direction of the gear train moving the gate 212 to the closed/blocking position to retain the candy piece in the chamber until the next dispensing cycle.

While the illustrated embodiments all include a rectangular configuration corresponding to rectangular shaped candy pieces, any geometric configuration may be used so long as the structure accommodates the intended functionality of the dispenser.

The invention herein contemplates embodiments that are digit actuated and electrically operated. That is, the mechanical drive mechanisms, described-above, are replaced by miniature battery powered, drive assemblies that move the torso/grabber elements by energizing a circuit upon actuation of the button. Other electrically powered variations may feature adjuncts such as sound and light generating elements. For example, light emitting diodes may be used as eyes and/or a microprocessor-based sound generating assembly may be incorporated to produce sounds during the dispensing actuation cycle. In such cases, the dispenser can be equipped with a battery and microswitch-actuated circuit that is activated when the digit actuated button is moved from its rest position to its candy dispensing actuating position.

Given the foregoing, variations and modifications to the invention should now be apparent. Its should be also be apparent that the dimensions illustrated herein are not intended to limit the invention so long as the invention functions in accordance with the foregoing. Such variations and modifications are intended to fall within the scope and spirit of the invention as defined by the following claims.

I claim:

1. A hand held candy dispenser comprising a housing;

a candy magazine for retaining pieces of candy in candy piece communication with the housing where the candy piece is generally rectangular;

a candy chamber disposed in said housing for receiving candy from said candy magazine;

a movable manipulator attached to and projecting from the housing and capable of movement between a first neutral position and a second candy piece contact position in said candy chamber, where the movable manipulator is a grabber that comprises a pair of opposed pinchers spaced apart by a distance corresponding to at least one dimension of the candy piece;

an actuating button associated with the housing connected to mechanical linkage contained within the housing where said linkage is also connected to said manipulator to move said manipulator from said first neutral position to said second candy piece contact position and back to said neutral position where said manipulator holds.

2. A hand held candy dispenser comprising a housing;

a candy magazine for retaining pieces of candy in candy piece communication with the housing;

a candy chamber disposed in said housing for receiving candy from said candy magazine;

a movable manipulator attached to and projecting from the housing and capable of movement between a first neutral position and a second candy piece contact position in said candy chamber, where the movable manipulator is in the form of a character torso and further includes-a spring for assisting return of the torso to the first neutral position;

an actuating button associated with the housing connected to mechanical linkage contained within the housing where said linkage is also connected to said manipulator to move said manipulator from said first neutral position to said second candy piece contact position and back to said neutral position where said manipulator holds the candy piece by an interference fit during the movement between said second candy piece contact position and said neutral position.

3. A candy dispenser, comprising: a candy chamber with a first and a second opening, candy magazine means for storing candy pieces and urging a select one of said candy pieces toward said second opening; a digit controlled actuating means for dispensing a select candy piece from said dispenser; means for removably covering said first opening, said covering means being moved from a covering position to an uncovering position upon actuating said actuating means, movable character means with a pair of opposed and spaced arms for frictionally engaging and retrieving said select one of said candy pieces from said chamber through said first opening where said character means is operatively linked to said digit controlled actuating means.

4. A method of dispensing from a candy dispenser according to claim 3 including the step of pushing said actuating means.

5. The candy dispenser of claim 3 where the candy piece is generally rectangular and the opposed arms are spaced apart by a distance corresponding to at least one dimension of the candy piece.

6. The candy dispenser of claim 3 where the movable character means moves between a first neutral position and a second candy dispensing position and is in the form of a character torso and further includes a spring for assisting return of the torso to the first neutral position.

7. The candy dispenser of claim 6 where the movement of the movable character means pivots proportionally to the movement of the actuating means.

8. A hand held candy dispenser comprising a housing;

a candy magazine for retaining pieces of candy in candy piece communication with the housing;

a candy chamber disposed in said housing for receiving candy from said candy magazine;

a movable manipulator attached to the housing and capable of movement between a first neutral position and a second candy piece contact position in said candy chamber;

where the manipulator is a character including arms to frictionally engage and retain a candy piece disposed within the chamber where said character is pivotally mounted on said housing and is mechanically linked to said actuating button via a rack and pinion and gear train assembly;

an actuating button associated with the housing connected to mechanical linkage contained within the housing where said linkage is also connected to said manipulator to move said manipulator from said first neutral position to said second candy piece contact position and back to said neutral position.

9. The dispenser according to claim 8 further including a retractable door associated with said chamber and mechanically linked to the button to translate upon movement thereof.

10. A hand held candy dispenser comprising a housing;

a candy magazine for retaining pieces of candy in candy piece communication with the housing;

a candy chamber disposed in said housing for receiving candy from said candy magazine;

a movable manipulator attached to and projecting from the housing and capable of movement between a first neutral position and a second candy piece contact position in said candy chamber, where the movable manipulator is a grabber that comprises a pair of opposed and spaced arms;

an actuating button associated with the housing connected to mechanical linkage contained within the housing where said linkage is also connected to said manipulator to move said manipulator from said first neutral position to said second candy piece contact position and back to said neutral position where said manipulator holds the candy piece by an interference fit during the movement between said second candy piece contact position and said neutral position.

11. The candy dispenser of claim 10 where the movement of the manipulator is proportional to the movement of the actuating button.

12. A hand held candy dispenser comprising a housing;

a candy magazine for retaining pieces of candy in candy piece communication with the housing;

a candy chamber disposed in said housing for receiving candy from said candy magazine;

a movable manipulator attached to and projecting from the housing and capable of movement between a first neutral position and a second candy piece contact position in said candy chamber, where the movable manipulator is a grabber that comprises a pair of opposed pinchers spaced apart by a distance corresponding to the candy pieces;

an actuating button associated with the housing connected to mechanical linkage contained within the housing where said linkage is also connected to said manipulator to move said manipulator from said first neutral position to said second candy piece contact position and back to said neutral position where said manipulator holds the candy piece by an interference fit during the movement between said second candy piece contact position and said neutral position.

* * * * *